(12) United States Patent
Zhao et al.

(10) Patent No.: US 11,190,775 B2
(45) Date of Patent: Nov. 30, 2021

(54) SYSTEM AND METHOD FOR REDUCING VIDEO CODING FLUCTUATION

(71) Applicant: SZ DJI TECHNOLOGY CO., LTD., Shenzhen (CN)

(72) Inventors: Liang Zhao, Shenzhen (CN); Wenyi Su, Shenzhen (CN); Lei Zhu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/931,260

(22) Filed: May 13, 2020

(65) Prior Publication Data
US 2020/0275105 A1  Aug. 27, 2020

Related U.S. Application Data

(63) Continuation of application No. PCT/CN2018/074568, filed on Jan. 30, 2018.

(30) Foreign Application Priority Data

Nov. 30, 2017 (WO) ............... PCT/CN2017/113848
Nov. 30, 2017 (WO) ............... PCT/CN2017/113926

(51) Int. Cl.
*H04N 19/149* (2014.01)
*H04N 19/115* (2014.01)
(Continued)

(52) U.S. Cl.
CPC ......... *H04N 19/149* (2014.11); *H04N 19/115* (2014.11); *H04N 19/126* (2014.11); *H04N 19/17* (2014.11)

(58) Field of Classification Search
None
See application file for complete search history.

(56) References Cited

U.S. PATENT DOCUMENTS

2010/0183069 A1  7/2010  Chen et al.
2011/0007977 A1  1/2011  Amonou et al.
(Continued)

FOREIGN PATENT DOCUMENTS

CN         1910934 A    2/2007
CN       101083768 A   12/2007
(Continued)

OTHER PUBLICATIONS

The World Intellectual Property Organization (WIPO) International Search Report and Written Opinion for PCT/CN2017/113848 dated Aug. 21, 2018 7 Pages.
(Continued)

*Primary Examiner* — Samuel D Fereja
(74) *Attorney, Agent, or Firm* — Anova Law Group, PLLC

(57) ABSTRACT

A method for supporting video coding includes obtaining an image frame including a plurality of coding block groups each including one or more coding blocks, using a first coding control model associated with a first coding block group in the image frame to estimate one or more first coding parameters, using a second coding control model associated with a second coding block group in the image frame to estimate one or more second coding parameters, determining one or more effective coding parameters based on an evaluation of the one or more first coding parameters and the one or more second coding parameters, and using the one or more effective coding parameters to encode the plurality of coding block groups in the image frame.

15 Claims, 12 Drawing Sheets

(51) Int. Cl.
*H04N 19/126* (2014.01)
*H04N 19/172* (2014.01)
*H04N 19/17* (2014.01)

(56) References Cited

U.S. PATENT DOCUMENTS

| | | | | |
|---|---|---|---|---|
| 2011/0075730 | A1* | 3/2011 | Samuelsson | H04N 19/142 375/240.03 |
| 2011/0200115 | A1 | 8/2011 | Hayashi et al. | |
| 2013/0272389 | A1 | 10/2013 | Sze et al. | |
| 2016/0073111 | A1* | 3/2016 | Lee | H04N 19/124 375/240.03 |
| 2016/0373767 | A1 | 12/2016 | Yang et al. | |
| 2017/0013261 | A1 | 1/2017 | Lin et al. | |
| 2017/0048522 | A1 | 2/2017 | Schoenblum et al. | |
| 2018/0020238 | A1 | 1/2018 | Liu et al. | |
| 2019/0349607 | A1* | 11/2019 | Kadu | H04N 19/117 |

FOREIGN PATENT DOCUMENTS

| | | |
|---|---|---|
| CN | 101141636 A | 3/2008 |
| CN | 101262603 A | 9/2008 |
| CN | 101674472 A | 3/2010 |
| CN | 101867802 A | 10/2010 |
| CN | 102148978 A | 8/2011 |
| CN | 102595143 A | 7/2012 |
| CN | 103313047 A | 9/2013 |
| CN | 103561270 A | 2/2014 |
| CN | 104113761 A | 10/2014 |
| CN | 104754361 A | 7/2015 |
| CN | 104885455 A | 9/2015 |
| CN | 105049853 A | 11/2015 |
| EP | 1835750 A1 | 9/2007 |
| EP | 2120463 A1 | 11/2009 |
| EP | 2301251 A1 | 3/2011 |
| JP | H0479587 A | 3/1992 |
| WO | 2009157827 A1 | 12/2009 |
| WO | 2010005691 A1 | 1/2010 |

OTHER PUBLICATIONS

The World Intellectual Property Organization (WIPO) International Search Report and Written Opinion for PCT/CN2018/074568 dated Aug. 29, 2018 8 Pages.

The World Intellectual Property Organization (WIPO) International Search Report and Written Opinion for PCT/CN2017/113926 dated Aug. 21, 2018 7 Pages.

Tao-Sheng Ou, et al., A Perceptual-Based Approach to Bit Allocation for H.264 Encoder, Visual Communications and Image Processing 2010, Proc. of SPIE, Jul. 2010, vol. 7744.

C. Rosewarne, et al., High Efficiency Video Coding (HEVC) Test Model 16 (HM16) Improved Encoder Description Update 9, Joint Collaborative Team on Video Coding (JCT-VC), 28th Meeting, Jul. 2017.

* cited by examiner

SYSTEM AND METHOD FOR REDUCING VIDEO CODING FLUCTUATION

CROSS-REFERENCE TO RELATED APPLICATIONS

This application is a continuation of International Application No. PCT/CN2018/074568, filed Jan. 30, 2018, which claims the benefit of priority of International Application No. PCT/CN2017/113926, filed Nov. 30, 2017, and International Application No. PCT/CN2017/113848, filed Nov. 30, 2017, the entire contents of all of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The disclosed embodiments relate generally to video processing, more particularly, but not exclusively, to video coding.

BACKGROUND

The consumption of video content has been surging in recent years, mainly due to the prevalence of various types of portable, handheld, or wearable devices. Typically, the video data or other media content is encoded at the source into an encoded (compressed) bit stream, which is then transmitted to a receiver over a communication channel. It is important, however, to control the bit rate of encoded bit streams in order to ensure that various constraints of the sender, the receiver, and/or the communication channel are met. For instance, it may be desirable to keep the bit rate of the encoded video frames below a certain maximum bit rate so as to prevent buffer overflow and coding fluctuation or to accommodate a bandwidth limitation. This is the general area that embodiments of the disclosure are intended to address.

SUMMARY

Described herein are systems and methods that can support video coding. A video encoder can obtain an image frame, wherein the image frame comprises a plurality of coding block groups, each of which comprises one or more coding blocks such as one or more macroblocks. The video encoder can use one or more coding control models to estimate a plurality of coding parameters such as a plurality of quantization parameters, wherein each coding parameter corresponds to a coding block group in the image frame. Furthermore, the video encoder can determine one or more effective coding parameters based on an evaluation of the plurality of coding parameters and use the one or more effective coding parameters to encode the plurality of coding block groups in the image frame.

DETAILED DESCRIPTION

The disclosure is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the disclosure as following uses the H.264 standards such as H.264 and High Efficiency Video Coding (HEVC) as examples for coding methods. It will be apparent to those skilled in the art that other types of coding methods can be used without limitation.

In accordance with various embodiments of the present disclosure, the system can provide a technical solution for supporting video coding, such as preventing coding fluctuation, to improve video coding quality, which a key factor for achieving satisfactory user experience. A video encoder can obtain an image frame, wherein the image frame comprises a plurality of coding block groups, each of which comprises one or more coding blocks such as one or more macroblocks. The video encoder can use one or more coding control models to estimate a plurality of coding parameters such as a plurality of quantization parameters, wherein each coding parameter corresponds to a coding block group in the image frame. Furthermore, the video encoder can determine one or more effective coding parameters based on an evaluation of the plurality of coding parameters and use the one or more effective coding parameters to encode the plurality of coding block groups in the image frame.

Figure 1:
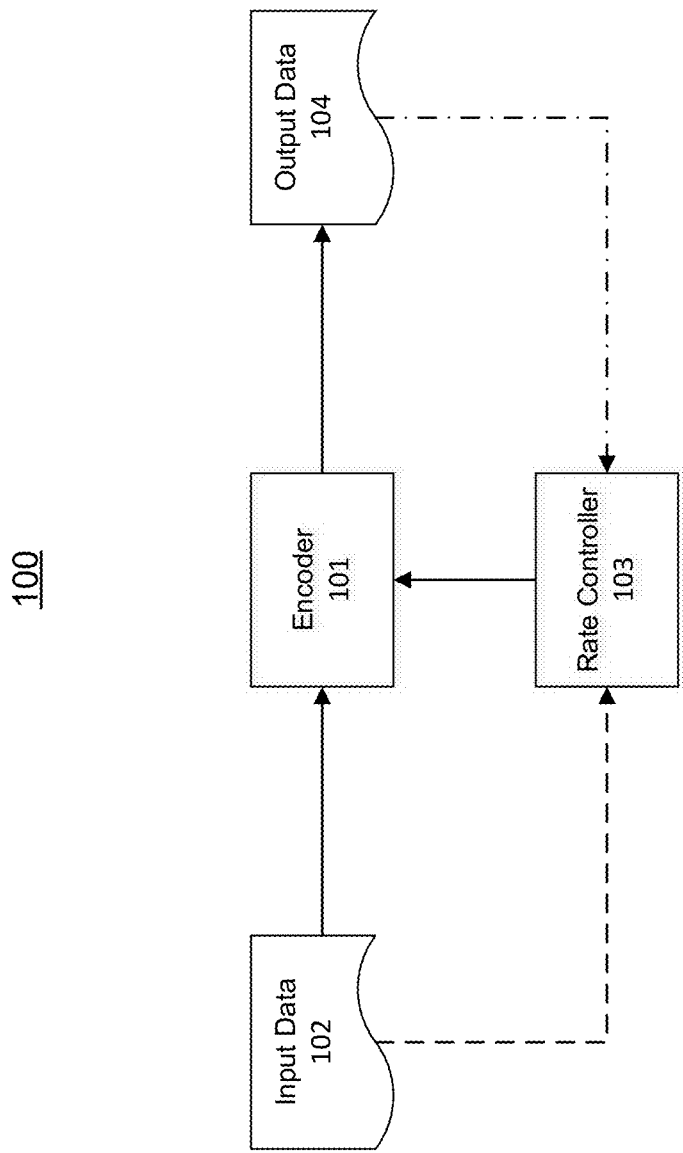
FIG. 1 illustrates an exemplary system for implementing coding rate control, in accordance with various embodiments of the present disclosure.

FIG. 1 illustrates an exemplary system 100 for implementing coding rate control, in accordance with various embodiments of the present disclosure. As shown in FIG. 1, an encoder 101 can be configured to receive and encode input data 102 to produce output data 104. For instance, the encoder 101 may be configured to receive videos as input data 102, and encode the input video data to produce one or more compressed bit streams as output data 104.

During data encoding, the encoder 101 may be configured to control the bit size of the encoded data (and hence the bit rate), e.g. via a rate controller 103. The encoder 101 and the rate controller 103 may be implemented by the same or different computing devices. In some embodiments, the rate controller 103 may form an integral part of the encoder 101; or vice versa. The encoder 101 is configured to receive input data 102, encode the input data 102, and provide output data 104 comprising the encoded data. The input data 102 can include text, images, graphic objects, animation sequences, audio recordings, videos, or any other data that needs to be encoded. In some cases, the input data 102 may include sensing data from one or more sensors such as vision sensors (e.g., cameras, infrared sensors), microphones, proximity sensors (e.g., ultrasound, LIDAR), position sensors, temperature sensors, touch sensors, and the like.

Encoding of the input data 102 can involve data compression, encryption, error encoding, format conversion, and the like. For example, multimedia data such as video or audio may be compressed to reduce the number of bits that are transmitted over the network. Sensitive data such as financial information and personal identification information may be encrypted before being transmitted or stored to protect confidentiality and/or privacy. Thus, the encoding of the input data 102 can be beneficial for efficient and/or secure transmission or storage of the data.

In accordance with various embodiments of the present disclosure, an encoder 101 may be configured to encode a series of video or image frames. In some embodiments, the encoder 101 may implement one or more different codecs. Each of the one or more codecs may take advantage of various codes, instructions or computer programs that implement different encoding algorithms. A suitable codec may be selected to encode a given set of input data based on various factors, including the types and/or sources of input data, the receiving entities of the encoded data, availability of computing resources, network environment, business requirements, regulations and standards, and the like.

Figure 2:
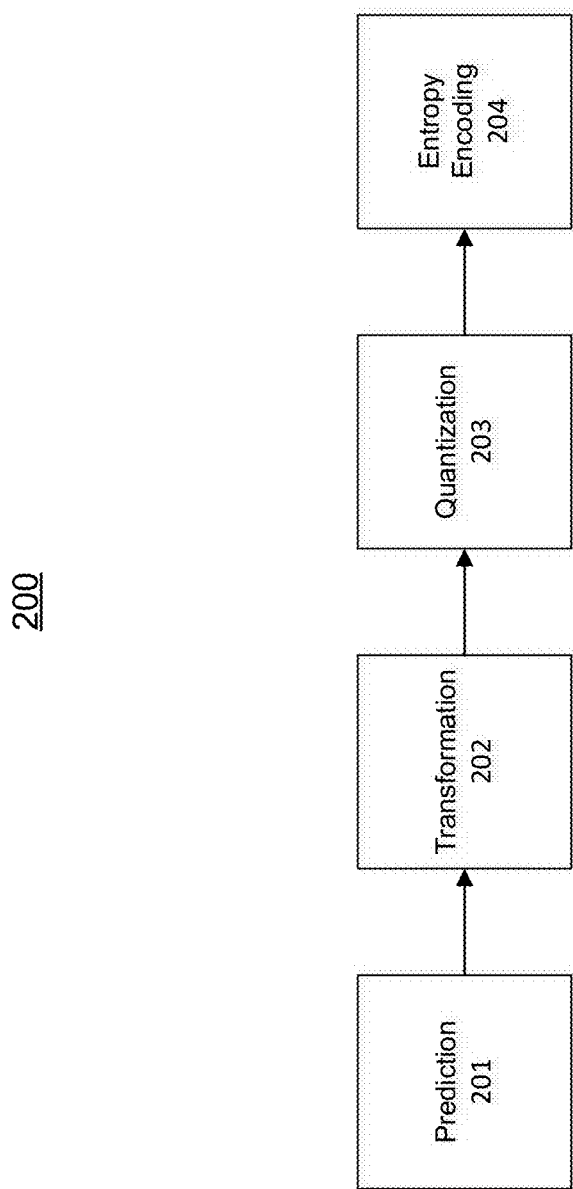
FIG. 2 shows an exemplary illustration of encoding/compressing a video, in accordance with various embodiments of the present disclosure.

FIG. 2 shows an exemplary illustration of encoding/compressing a video, in accordance with various embodiments of the present disclosure. As shown in FIG. 2, data in each frame may be encoded using a series of steps, such as a prediction step 201, a transformation step 202, a quantization step 203 and an entropy encoding step 204.

In accordance with various embodiments, the prediction step 201 can be employed for reducing redundant information in the image frame. The prediction step 201 can include intra-frame prediction and inter-frame prediction. The intra-frame prediction may be performed based solely on information that is contained within the current frame, independent of other frames in the video sequence. For example, the encoding process can be used to encode intra frames (I frames) based primary or entirely on spatial information contained within the intra frame (or I frame). Inter-frame prediction can be performed by eliminating redundancy in the current frame based on a reference frame, e.g. a previously processed frame. For example, the encoder 103 may be configured to exploit temporal redundancy between the frames and encode inter frames (e.g., P frames or B frames) based on forward and/or backward predictions made from previous and/or subsequent frames.

In accordance with various embodiments, a frame may be forward and/or backward predicted for inter-frame prediction based on a previous frame and/or a subsequent frame by estimating motion of the camera and/or objects in the video. For example, in order to perform motion estimation for inter-frame prediction, a frame can be divided into a plurality of image blocks. Each image block can be matched to a block in the reference frame, e.g. based on a block matching algorithm. In some embodiments, a motion vector (MV), which represents an offset from the coordinates of an image block in the current frame to the coordinates of the matched image block in the reference frame, can be computed. Also, the residuals, i.e. the difference between each image block in the current frame and the matched block in the reference frame, can be computed and grouped. The system can process the residuals for improving coding efficiency. For example, transformation coefficients can be generated by applying a transformation matrix (and its transposed matrix) on the grouped residuals.

Any suitable motion estimation techniques may be used to determine the motion vectors between adjacent frames, including pixel based methods (e.g., block-matching) and feather based methods (e.g., corner detection). If an acceptable match of a corresponding data unit (e.g., macroblock) is not found, then the encoder may encode the data unit as an intra data unit. In various embodiments, the predicted frame may be subtracted from its reference to generate the residual (error) frame. The data included in the residual (error) frame may be spatially encoded in a similar fashion as for an intra-frame. For example, one or more data matrices of the residual error frame may be transformed (e.g., using DCT) and quantized. The quantized transform coefficients of the residual error frame, the motion vectors or the difference between motion vectors of adjacent frames, along with any other suitable data needed to reconstruct the frame may be entropy encoded. The bit rate of the encoded data may be controlled at least in part by a quantization parameter provided by a rate controller.

During the transformation step 202, the input data and/or the residuals may be transformed into a different domain (e.g., spatial frequency domain) suitable for the data content of the input data (e.g., video). Any suitable coding transformation techniques may be used, including Fourier-type transforms such as discrete cosine transform (DCT) or modified DCT. For example, a DCT matrix is determined based on a size of the data unit. The data unit may include a block of 4×4 or 8×8 pixels, a macroblock of 16×16 pixels, or any suitable set of data. The DCT matrix is then applied to the data unit using matrix multiplication, yielding a transformed matrix comprising transformation coefficients.

Subsequently, the transformation coefficients can be quantized at a quantization step 203 and can be encoded at an entropy encoding step 204. At the quantization step 203, the coefficients in the transformed matrix may be quantized, for example, by dividing each coefficient by a corresponding element in a quantization matrix, and then rounding to the nearest integer value. The quantization matrix may be derived using a quantization parameter (also referred to as a quantization index). For example, the quantization parameter may be the value for each element of the quantization matrix. In another example, some or all of the elements in the quantization matrix may be scaled (multiplied or divided) by the quantization parameter and the scaled quantization matrix may be used to quantize the transformed matrix. The quantization parameter may be an integer within a certain range (e.g., between and including 0 and 128). Typically, the higher the value of the quantization parameter, the larger the quantization step size is and the larger the element values are in the quantization matrix. This may cause more transformation coefficients to be quantized to zero or near-zero. The more zero or near-zero coefficients there are, the less bits are required to encode the coefficients, resulting in lower bit size (and hence lower bit rate) for the data unit represented by the coefficients. The opposite is also true, that is, a lower value of a quantization parameter corresponds to a smaller quantization step size, a greater number of bits required to encode the quantized coefficients, and a higher bit size (and hence higher bit rate) for the data unit encoded using the quantization parameter. Techniques are provided herein for controlling the bit rate of the encoded input data by varying the quantization parameters used to encode portions of the input data.

At the entropy encoding step 204, the quantized coefficients in a quantized matrix can be scanned in a predetermined order and encoded using any suitable coding technique. For example, since most of the non-zero DCT coefficients are likely concentrated in the upper left-hand corner of the matrix, a zigzag scanning pattern from the upper left to the lower right is typical. Alternative scanning order such as a raster scan may be used. The scanning order may be used to maximize the probability of achieving long runs of consecutive zero coefficients. The scanned coefficients can then be encoded using run-length encoding, variable-length encoding, or any other entropy encoding techniques, to generate the output data 104.

Then, the bit stream including information generated from the entropy encoding step 104, as well as other encoding information (e.g., intra-frame prediction mode, motion vector) can be stored and/or transmitted to a decoder (not shown) at the receiving end. The decoder may be configured to perform decoding steps that are the inverse of the encoding steps of the encoder in order to generate reconstructed data. The decoder can perform a reverse process (such as entropy decoding, dequantization and inverse transformation) on the received bit stream to obtain the residuals. Thus, the image frame can be decoded based on the residuals and other received decoding information. In various embodiments, the reconstructed data (i.e. the decoded image) may then be displayed or played back. For example, to decode intra encoded data (e.g., I frames), the decoding steps may include an entropy decoding step (e.g., using variable length decoding), an inverse quantization step, and an inverse transform step (e.g., using Inverse Discrete Cosine Transform (IDCT)) that perform the inverse of the corresponding entropy encoding, quantization, and transform steps of the encoder. To decode inter encoded data (e.g., B frames or P frames), the decoding process can include additional motion compensation support.

Referring to FIG. 1, the rate controller 103 may be configured to control the bit rate of the output data by providing the encoder 101 with one or more coding parameters (also referred to as rate control parameters). The bit rate may be controlled to be within a certain range (e.g., below a maximum bit rate, above a minimum bit rate) or close to a target average bit rate. Alternatively, the bit rate may be controlled to vary depending on the complexity of the frames, bandwidth limit, buffer capacity, and other factors. The coding parameters can include one or more quantization parameters (QPs) for controlling the quantization step of the encoding process and hence the bit rate of the resulting output data. The quantization parameters may include, for example, a quantization step size, a value indicative of or related to a quantization step size such as a QP used in H.264 or similar encoders, a quantization matrix or a reference thereof, and the like. The coding parameters may include parameters for controlling other aspects of the encoding process such as the prediction step, the transform step, and/or the entropy encoding step. For instance, coding parameters may include a cutoff index used for removing certain high frequency coefficients before the coefficients are entropy encoded. Other examples of the coding parameters may include bit allocation information (e.g., maximum, minimum, or target bits allocated for encoding a data unit), a frame rate, a size of a data unit to be transformed and quantized, motion detection thresholds used to determine whether to code or skip coding a data unit (e.g., macroblock), Lagrange multiplier used in rate distortion optimization, algorithms and parameters used for the prediction, transform, and/or entropy encoding steps, and the like.

The rate controller 103 may be configured to control rate (e.g., by providing the code parameters) based at least in part on output information about the output data 104 and/or the encoder 101. The output information may be provided by the encoder 101 or optionally derived by the rate controller 103 based on the output data 104. The output information may include, for example, a number of bits used to encode a data unit (e.g., a frame, a slice, a macroblock), parameters (including algorithms) used to encode the data unit, encoder resource information (e.g., CPU/memory usage, buffer usage), and the like. Such information may be used by the rate controller 103 to adjust one or more coding parameters (e.g., a quantization parameter) for one or more subsequent data units.

The rate controller 103 may optionally be configured to control rate based at least in part on input information about the input data 102. Input information may include any characteristics of the input data that may be used for rate control, such as resolution, size, image complexity, texture, luminance, chrominance, motion information, and the like. For example, highly complex input data may be encoded with a higher bit rate than less complex input data.

In some embodiments, the rate controller 103 may be configured to control rate based on one or more rate control threshold parameters. The values of the threshold parameters may be predefined and/or dynamically updated by a user, a system administrator, the rate controller 103, or any other component or device. The rate control threshold parameters may be used to derive coding parameters. In some embodiments, the threshold values used to determine the coding parameters for encoding a given slice may vary depending on an encoding order of the slice relative to other slices of a frame.

In some embodiments, the rate controller 103 may be configured to control rate based on additional information. Such information may include decoder information from an entity configured to receive, decode, and/or playback or display the output data 108. For example, such information may be related to the decoder buffer usage, delay, noise, and/or playback quality. Additionally, such information may be related to the current computing environment (e.g., network bandwidth, workload), user instructions, or any other suitable information relevant to rate control.

In accordance with various embodiments, the output data 104 may be stored at a local or remote data store and/or provided to a local or remote decoder. The output data 104 may be transmitted over a communication channel. Exemplary communication channels include wired or wireless networks such as the Internet, storage area network (SAN), local area networks (LAN), wide area networks (WAN), point-to-point (P2P) networks, Wi-Fi network, radio communication, and the like.

The following discussion focus on the encoding of input data comprising single value pixel data. However, it is understood that the techniques discussed herein can be extended to input data where each pixel is represented by multiple data values corresponding to multiple components, such as color space channels. For instance, a block of image data may be represented by multiple blocks of the same size or different size, each block comprising pixel data related to a particular component or channel of a color space associated with the image data. In one example, an 8×8 block of YCbCr encoded image data may be represented by an 8×8 block of Y (luma) data and two blocks of chrominance data corresponding to Cb and Cr channels respectively (e.g. the sizes of which corresponds to different sample rates). The encoding steps discussed herein can be applied to each of the luma and chrominance data blocks in order to encode the entire input data.

Figure 3:
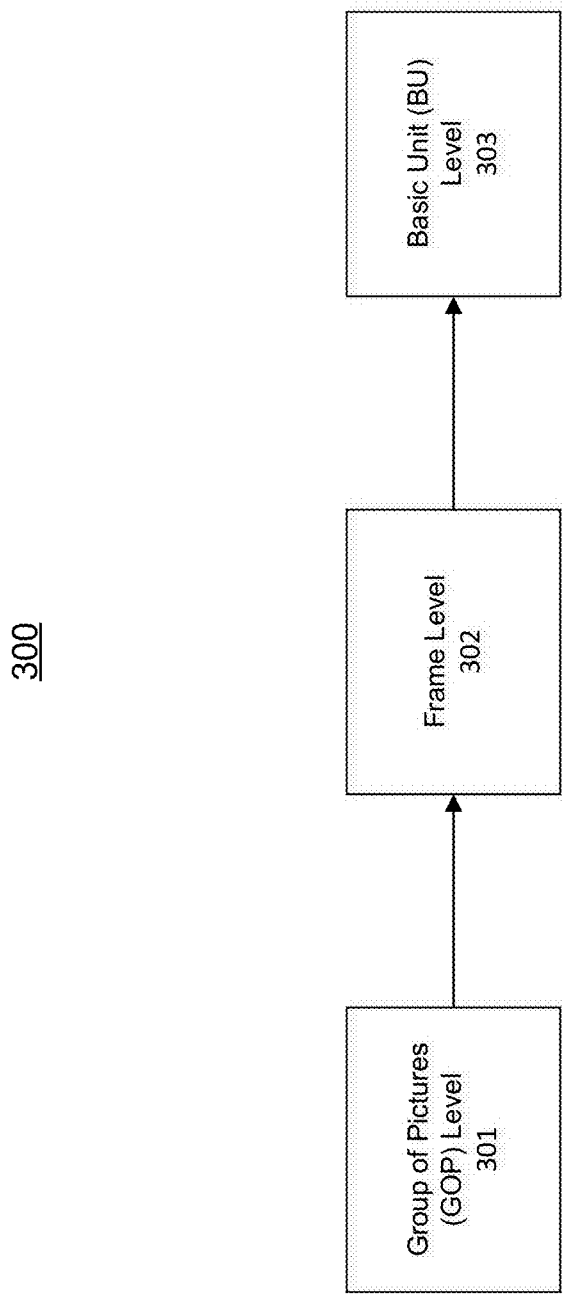
FIG. 3 illustrates a series of exemplary data levels, in accordance with various embodiments of the present disclosure.

In accordance with various embodiments of the present disclosure, video encoding and rate control can be implemented at any suitable data level or levels. FIG. 3 illustrates a series of exemplary data levels 300, which may include group of pictures (GOP) level 301, frame level 302, and basic unit level 303. In various embodiments, a group of pictures (GOP) may refer to a collection of successive (or non-successive) pictures within a coded video stream. For example, a GOP may comprise a stream of image frames including both intra and inter prediction frames. Alternatively, a GOP may comprise a plurality of inter prediction frames only.

In various embodiments, video coding techniques may be applied on different basic units. The basic unit level may be defined differently for different coding standards or applications. For example, in H.264, the basic unit level may be slice level, macroblock level, block level, pixel level, and/or the like. Alternatively, in HEVC, the basic unit level may be coding tree unit (CTU) level, coding unit (CU) level, and/or the like.

Figure 4:
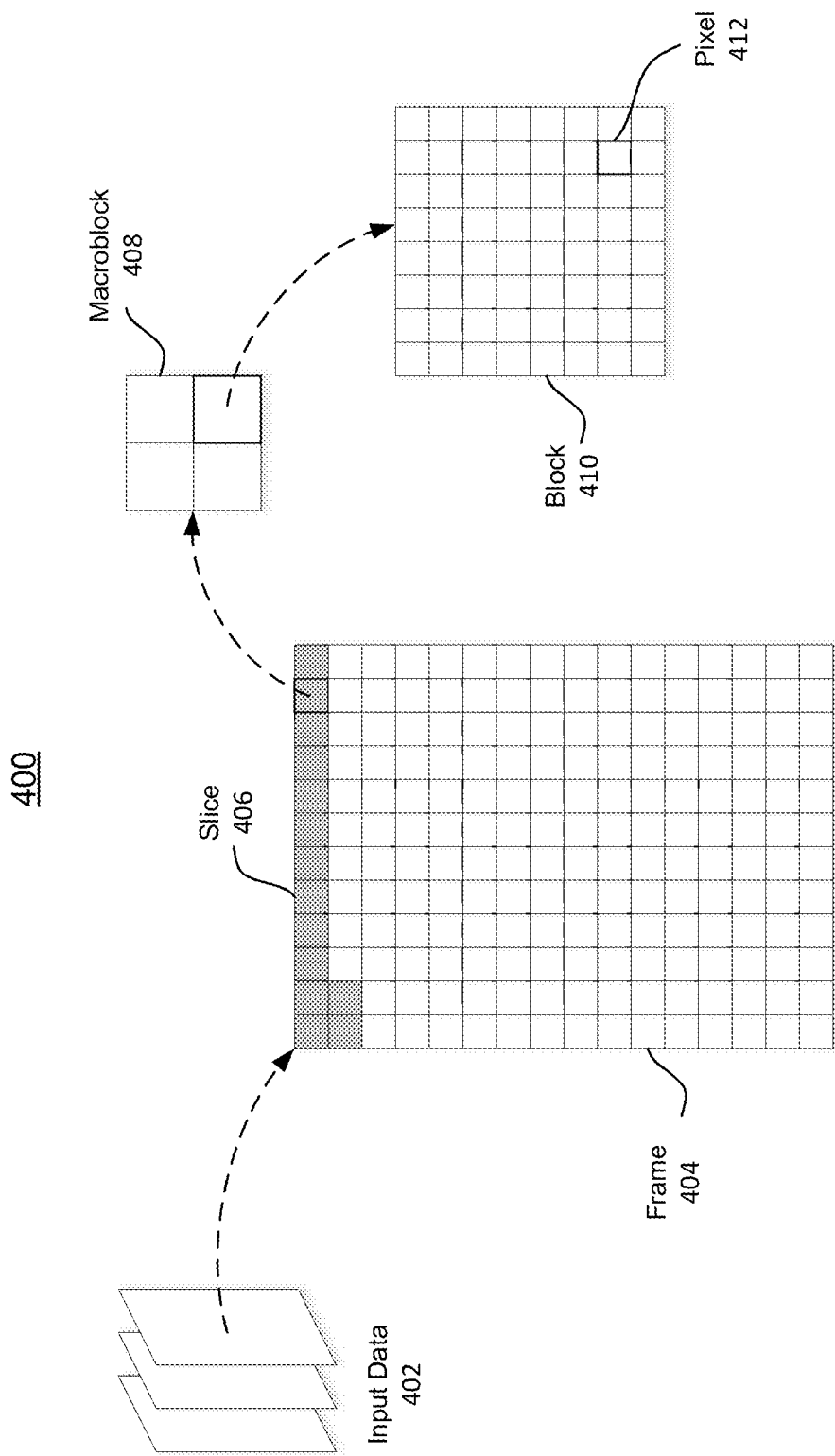
FIG. 4 illustrates exemplary data units to be encoded, in accordance with various embodiments of the present disclosure.

FIG. 4 illustrates exemplary data units to be encoded, in accordance with various embodiments of the present disclosure. As illustrated, in H.264, a data unit may refer to a frame, a slice, a macroblock, a blocks, a pixel, or a group of any of the above. For example, in an exemplary system 400 supporting H.264, an input data 402 can comprise a plurality of image frames, such as consecutive image frames in a video stream. A frame 404 may comprise one or more slices 406, and each slice may comprise one or more macroblocks 408. Furthermore, a macroblock 408 may comprise one or more blocks 410, each of which may comprise one or more pixels. For example, a pixel 412 may comprise one or more sets of data corresponding to one or more data components such as luminance data component and chrominance data component.

Figure 5:
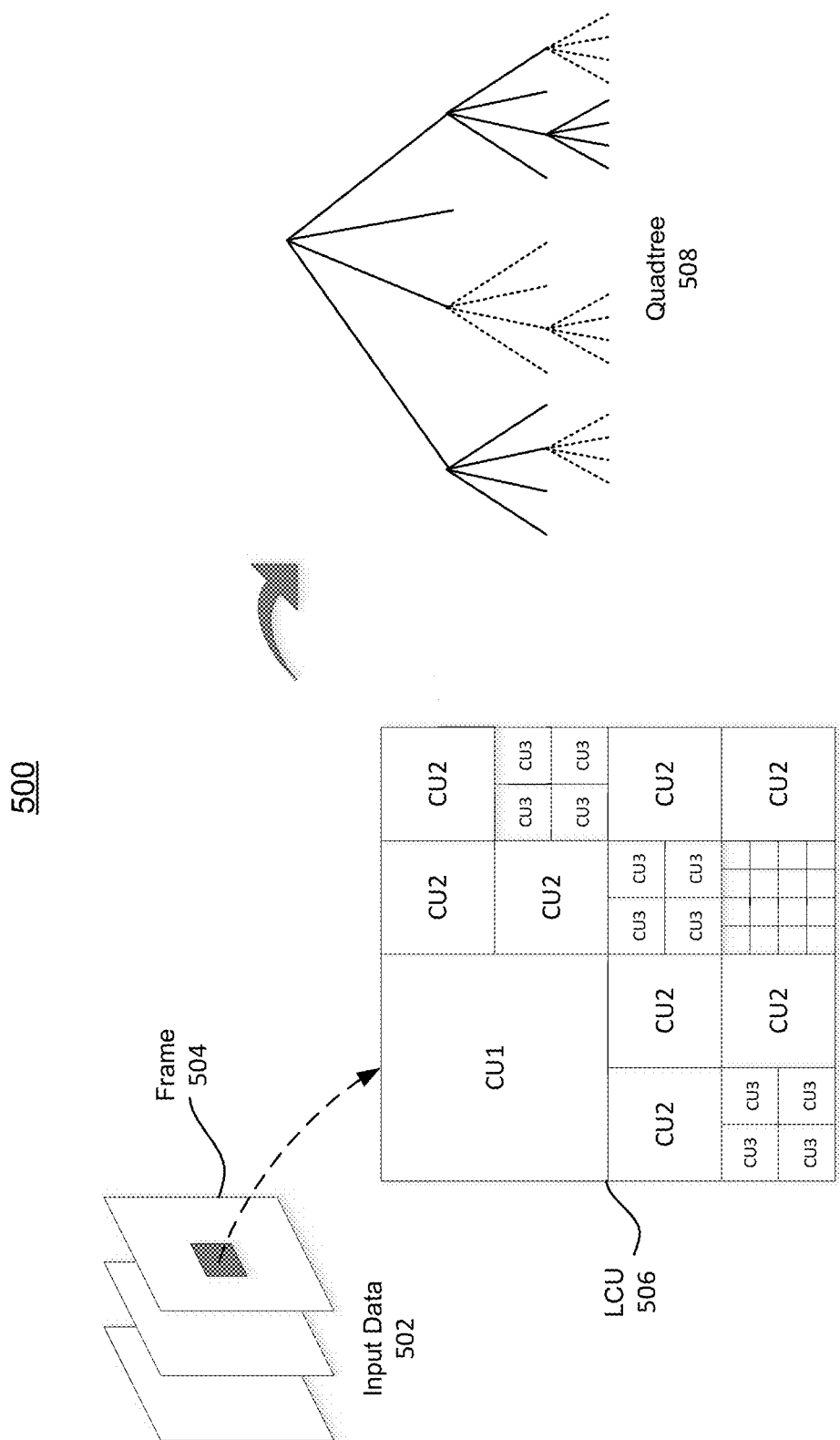
FIG. 5 illustrates exemplary hierarchical data units to be encoded, in accordance with various embodiments of the present disclosure.

FIG. 5 illustrates exemplary hierarchical data units to be encoded, in accordance with various embodiments of the present disclosure. As illustrated, an input data 502 can comprise a plurality of frames 504, which may represent consecutive image frames in a video stream. For example, in an exemplary system 500 supporting HEVC, each frame 504 may comprise one or more coding tree units (CTUs) or largest coding units (LCUs) 506, which may be represented using a quadtree 508 in a hierarchical fashion. As illustrated, each LCU 506 may comprise one or more coding units (CU)s. Each CU may comprise one or more blocks. Each block may comprise one or more pixels. Each pixel may comprise one or more sets of data corresponding to one or more data components such as luminance data component and chrominance data component.

In various embodiments, the encoding steps discussed herein can be applied to any suitable data level or levels. Applying an encoding step at a certain data level may indicate that an entire (or a portion of a) data unit at the given data level may be encoded before the encoding step is applied to the next data unit. The encoding steps may be applied at the same data level. For instance, using the H.264 standard, the transformation step and/or quantization step can be applied at a block level (e.g., to 8×8 pixel blocks), a macroblock level (e.g., to 16×16 pixel macroblocks), or at a slice level. Alternatively, different encoding steps may be performed at different data levels. For instance, the transformation step may be performed at the macroblock level, the quantization step may be performed at the slice level, and the entropy encoding step may be performed at the frame level. In one example, all the macroblocks within a given slice may be transformed one by one before the entire transformed slice is quantized, and all the slices within a frame may be quantized before the quantized coefficients are entropy encoded.

Similarly, the rate control parameters may be applicable to any suitable data level or levels. For example, a single quantization parameter may be used for the quantization of a block, a macroblock, or a slice. In some embodiments, different rate control parameters may be associated with different encoding operations, which may be applied to different data levels. For example, a motion detection threshold may be used for motion detection of macroblocks, a quantization parameter may be used for quantization of slices, and another rate control parameter may be used during entropy encoding of an entire frame.

Figure 6:
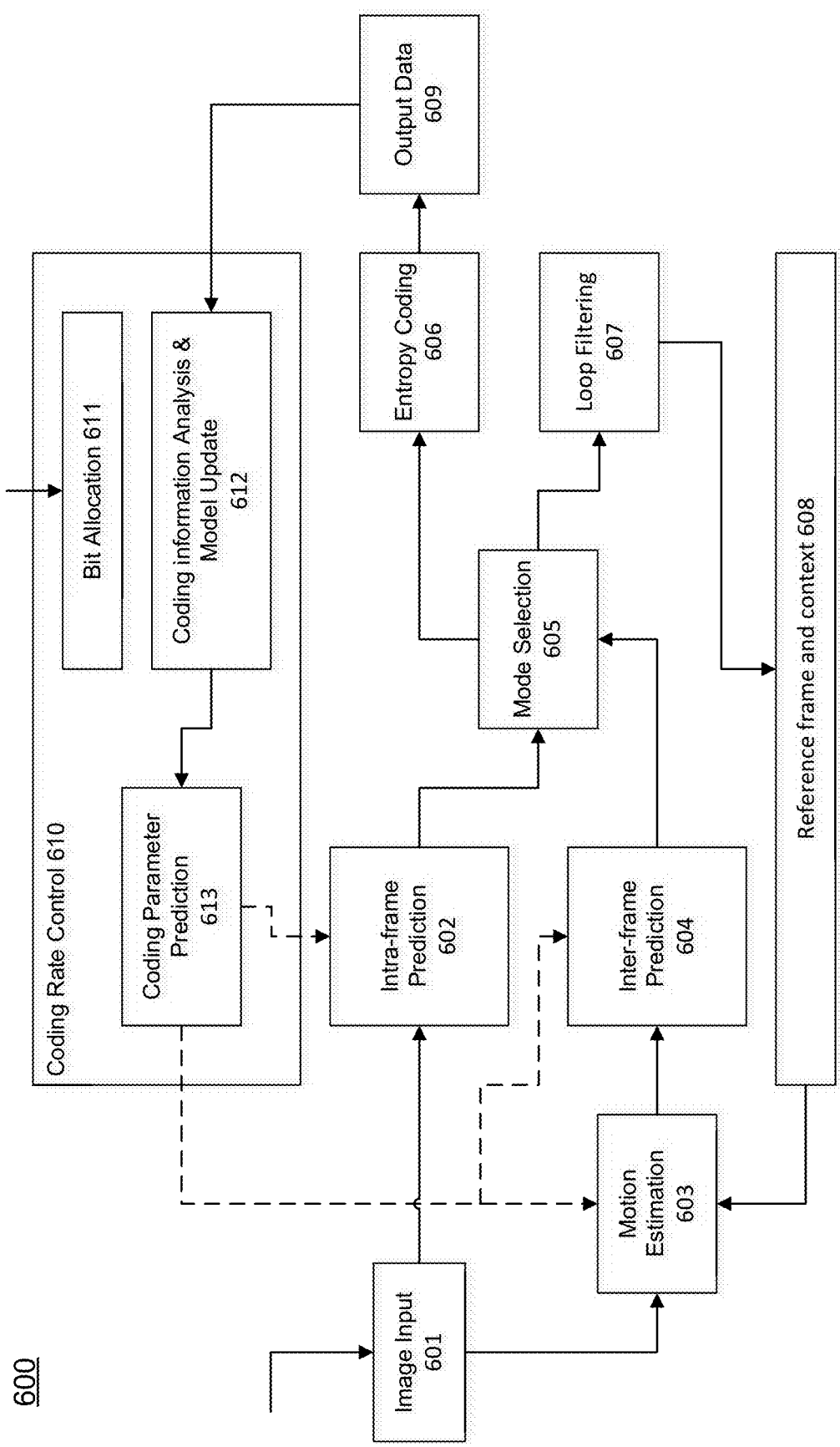
FIG. 6 illustrates an exemplary encoder with rate control, in accordance with various embodiments of the present disclosure.

FIG. 6 illustrates an exemplary encoder with rate control, in accordance with various embodiments of the present disclosure. As illustrated in FIG. 6, an encoder 600 can encode input data, such as an image input 601 that may be partitioned into multiple image blocks for coding. The encoding can be based on intra-frame prediction 602 and inter-frame prediction 604. The intra-frame prediction 602 may be performed based solely on information that is contained within the current frame, independent of other frames in the video sequence. Inter-frame prediction 604 can be performed by eliminating redundancy in the current frame based on a reference frame, e.g. a previously processed frame. Furthermore, the inter-frame prediction 604 may be based on motion estimation 603. The inter-frame prediction 604 may involve choosing motion data comprising the selected reference picture and motion vector (MV) to be applied for predicting the samples of each image blocks.

There may be different available modes for coding an image block. For example, in H.264, the available coding modes for a macroblock in an I-slice include: intra_4x4 prediction and intra_16x16 prediction for luma samples, and intra_8x8 for chroma samples. In HEVC, the number of coding modes are substantially increased along with the increased number of sizes of the coding unites (CUs). As shown in FIG. 6, the encoder 600 can perform a mode selection 605 step to select an optimal coding mode for encoding the image block. Then, the encoder 600 can perform entropy coding 606 for generating the output data 609, using the selected coding mode.

Additionally, the encoder 600 can perform a loop filtering 607, e.g. in order to reduce or suppress the blocking artifacts in the reference frames. For example, in HEVC, the system can take advantage of a pair of filters, such as a de-blocking filter (DBF) and a sample adaptive offset filter (SAO). After removing the blocking artifacts, the output from the in-loop filter can be stored in the reference frame and context 608 and can be used in the encoding of the next block(s), e.g. for motion estimation 603.

As illustrated in FIG. 6, a coding rate control module 610 may be responsible for bit allocation 611, coding information analysis and model update 612, and coding parameter prediction 613. For example, in H.264, the implementation of the macroblock rate control scheme may comprise several processes: macroblock target bit pre-allocation, macroblock group target bit adjustment, macroblock group coding QP prediction, entropy coding information (statistics) collection and macroblock model parameter updates. Subsequently, the predicted coding parameters can be used in the intra-frame prediction 602 motion estimation 603, and inter-frame prediction steps 604 for coding the next image frame.

Figure 7:
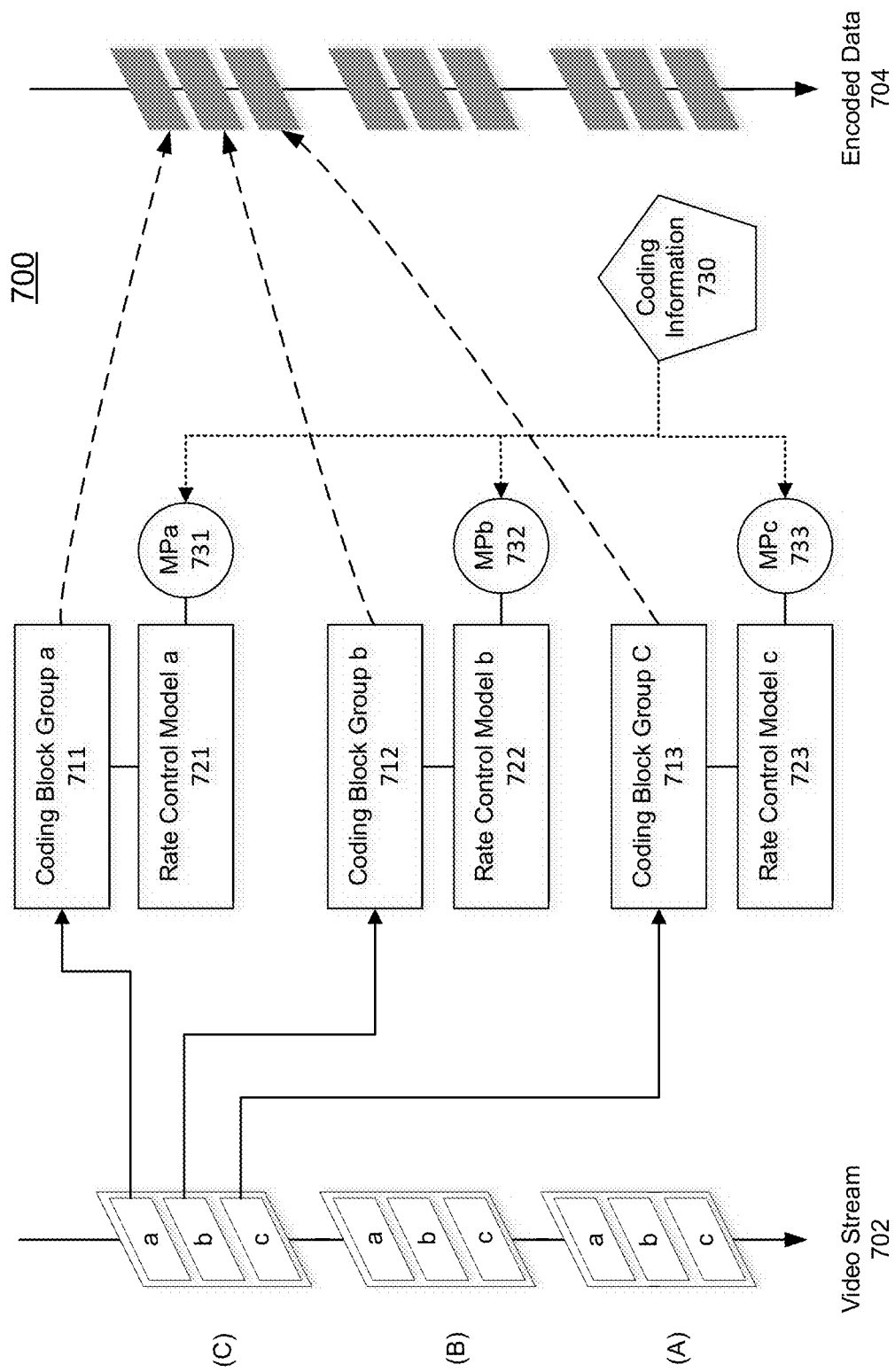
FIG. 7 shows an exemplary illustration of controlling the rate for coding a stream of image frames, in accordance with various embodiments of the present disclosure.

FIG. 7 shows an exemplary illustration of controlling the rate for coding a stream of image frames, in accordance with various embodiments of the present disclosure. As illustrated, a video encoder 700 can be used for encoding a video stream 702 into encoded data 704. The input video stream 702 may include a plurality of images frames, such as image frames A-C. Each of the image frames A-C can be partitioned into different coding block groups, such as coding block groups a-c 711-713, each of which may comprise a group of basic image units (i.e. a control group).

In accordance with various embodiments, each coding block group a-c may be associated with a separate control model. Additionally, corresponding coding block groups in different image frames may share the same control model. For example, the coding block group a 711 in each of the image frames A-C may take advantage of a control model 721 with one or more model parameters 731; the coding block group b 712 in each of the image frames A-C may take advantage of a control model 722 with one or more model parameters 732; and the coding block group c 713 in each of the image frames A-C may take advantage of a control model 723 with one or more model parameters 733.

In accordance with various embodiments, the granularity of rate control may depend on the selection of coding block groups (e.g. control groups of basic units). For example, in H.264, a basic unit for coding can be a macroblock, and a coding block group may be chosen as a group of macroblocks, such as a slice, a tile, or a row of macroblocks. Alternatively, in HEVC, a basic unit can be a coding tree unit (CTU), and a coding block group may be chosen as a group of CTUs. In HEVC, a CTU, also referred to as a largest coding unit (LCU), may be further divided into one or more coding tree blocks (CTBs) and coding units (CUs).

In accordance with various embodiments of the present disclosure, various methods can be employed for performing rate control without limitation. In one example, the rate-distortion optimization (RDO) process may use a rate-quantization (R-QP) model, e.g. based on the following quadratic rate-distortion (R-D) model.

$$R = \frac{a}{QP} + \frac{b}{QP^2}$$

In another example, the rate-distortion optimization (RDO) process may employ an R-λ model. Using the R-λ model, the determination of a Lagrangian multiplier, λ, is independent from the RDO process. For example, in the reference software for the HEVC standard, a rate control scheme can be implemented using the largest coding unit (LCU). The bit allocation step can be performed for calculating the weight based on an R-λ control model for each LCU (e.g., in the size of 64×64 pixels). Then, the system can adjust the bit allocation based on the outcome (or error) of the coded LCU and calculate the QP for the next LCU.

In accordance with various embodiments of the present disclosure, a logarithm R-QP model can be used for rate control to avoid coding fluctuation. For example, the following logarithm R-QP model can be employed.

$$ln(bpp) = \alpha \cdot QP + \beta$$

In the above logarithm model, α and β are parameters related to the video content. Also, the rate R can be represented using the bits per pixel (bpp), which can be calculated using the following formula, $$bpp = \frac{R}{f \cdot w \cdot h}$$

where f represents the frequency of the video frame series, and w and h represents the width and height of the video frame. In various embodiments, the use of bits per pixel (bpp) allows the rate control model to account for flexible unit and/or variable block size (e.g. for coding units in the HEVC standard). Thus, the rate control scheme based on a logarithmic R-QP model can achieve precise control of the video coding with efficiency. Even when the source content changes drastically, the bit rate control algorithm can achieve the efficient use of channel bandwidth, while reducing the frame-level delay during the transmission process.

Figure 8:
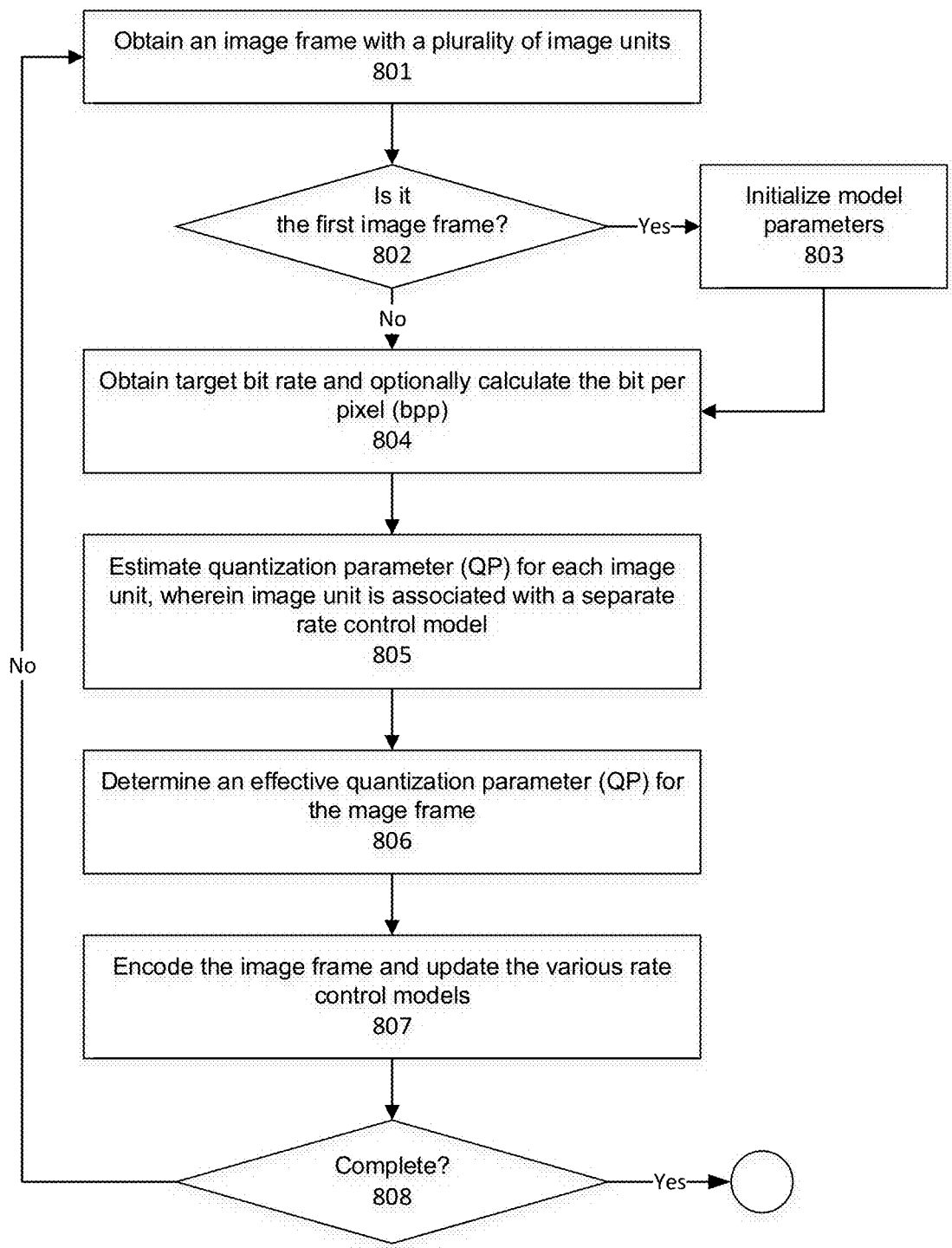
FIG. 8 illustrates an exemplary rate control scheme, in accordance with various embodiments of the present disclosure.

FIG. 8 illustrates an exemplary rate control scheme 800, in accordance with various embodiments of the present disclosure. As illustrated, at step 801, the encoder can obtain an image frame from a video stream. Different approaches may be used for coding different types of image frames. For example, the obtained image frame may be an intra frame (e.g. an I frame) or an inter frame (e.g. a P frame or a B frame). Due to the difference in the number of bits consumed for coding different types of frames, the encoder may only apply rate control, e.g may only update rate control model, for the same type of coding frames. Also, the bit rate control model for each image frame can be updated iteratively on a frame-by-frame basis. In examples of the Low-Delay P frame structure (IPPPPPP . . . ) or the Period-I frame structure (IPPP . . . IPPP . . . ) in H.264, the model update may be performed for the P frames only. On the other hand, the rate control models for the I-frames may not be updated, even though the rate control model may be used to predict QP value for the I-frames.

Furthermore, the encoder can initialize model parameters for various coding models. For instance, at step 802, the encoder can determine whether the obtained image frame is the first image frame in the video stream (or series). If the obtained image frame is the first image frame in the video stream, then the encoder can initialize the model parameters at step 803. For example, the parameters, α and β, in the above logarithm model can be initialized with initial values $\alpha_0$ and $\beta_0$ that are predetermined. Otherwise, the encoder can take advantage of an existing rate control model that may be (or not) updated following the coding of a preceding image frame.

At step 804, the encoder can obtain target bit rate (R) at the frame level for the obtained image frame. Furthermore, the encoder can distribute (or allocate) bit rate at the frame level to each individual image unit in the image frame. For example, the encoder can calculate the bits per pixel (bpp)

for each image unit in the obtained image frame based on the target bit rate. In various embodiments, the encoder can distribute the target bit rate evenly across multiple image units. Alternatively, the encoder can distribute the target bit rate unevenly in order to take into account the characteristics of the image, e.g. the content complexity distribution in an image frame.

At step 805, the encoder can estimate a quantization parameter (QP) for each image unit (such as a coding block group). As shown in FIG. 7, each image unit in an image frame can be associated with a separate rate control model. Thus, the encoder can calculate the QP value for any given image unit in the image frame, based on the rate control model associated with the particular image unit and the allocated bit rate for the particular image unit. In various embodiments, the rate control model employed for the different image units (such as coding block groups) in the image frame can be different. For example, the encoder may use the above logarithm model to estimate the QP value for encoding a particular image unit. Additionally, the encoder may use the above quadratic model or other models to estimate the QP for encoding other image units in the image frame.

In various embodiments, the encoder can calculate quantization parameter (QP) value for the coding block group based on an adjusted target bit. For example, the encoder can adjust the target bit rates pre-allocated to each coding block group to account for the complexity of content (or content complexity) in the image. The encoder can adjust coding parameters according to the content complexity, in order to improve the coding efficiency and coding quality. In various scenarios with low bit rate, the system can adjust the coding parameters in order to focus on the most sensitive areas in an image frame. In various embodiments, the system can determine that a coding block group corresponds to a flat area with less texture, e.g. when the value of a pre-allocated bit rate is less than a threshold. Also, the encoder can determine that a coding block group corresponds to a complex area with more texture, e.g. when the value of a pre-allocated bit rate is higher than a threshold with the same or a different value. For example, the value of these thresholds may be determined according to the average bit rate, e.g. a threshold can be defined as a predetermined ratio to the average bit rate (such as 0.01, 0.05, 0.1, 0.5, 1.0, and 1.5, etc.). Then, the value of a QP for coding a particular coding block group can be adjusted, e.g. by adding or subtracting a predetermined value. Additionally, in order to increase the visual quality of the coded image, the flat areas in an image frame may be categorized into multiple levels (or sub-regions), distinguished using different thresholds and encoded with different QPs. Similarly, the complex areas in an image frame may also be categorized into multiple levels, distinguished using different thresholds and encoded using different QPs. Thus, the system can improve the smoothness in data transmission, especially in various low coding rate scenarios, by reducing the resource allocated to visually insensitive areas.

Furthermore, at step 806, the encoder can determine the value of an effective quantization parameter (QP) for encoding the image frame in order to reduce coding fluctuation. For example, the encoder can select a QP with the largest value from the different QPs that are estimated for the different coding block groups in the image frame. Alternatively, the encoder can determine the effective QP as an average or a weighted average of the different QPs that are estimated for the different coding block groups in the image frame.

In various embodiments, in order to improve user experience and achieve satisfactory visual quality, values of the QPs for coding the successive image frames may not vary drastically. For example, it may be beneficial to apply the following constraint (which is based on a predetermined value, $\Delta QP$) on the $QP_i$ according to the coding parameter for a preceding image frame, $QP_{i-1}$.

$$QP_{i-1} - \Delta QP \leq QP_i \leq QP_{i-1} + \Delta QP$$

Figure 12:
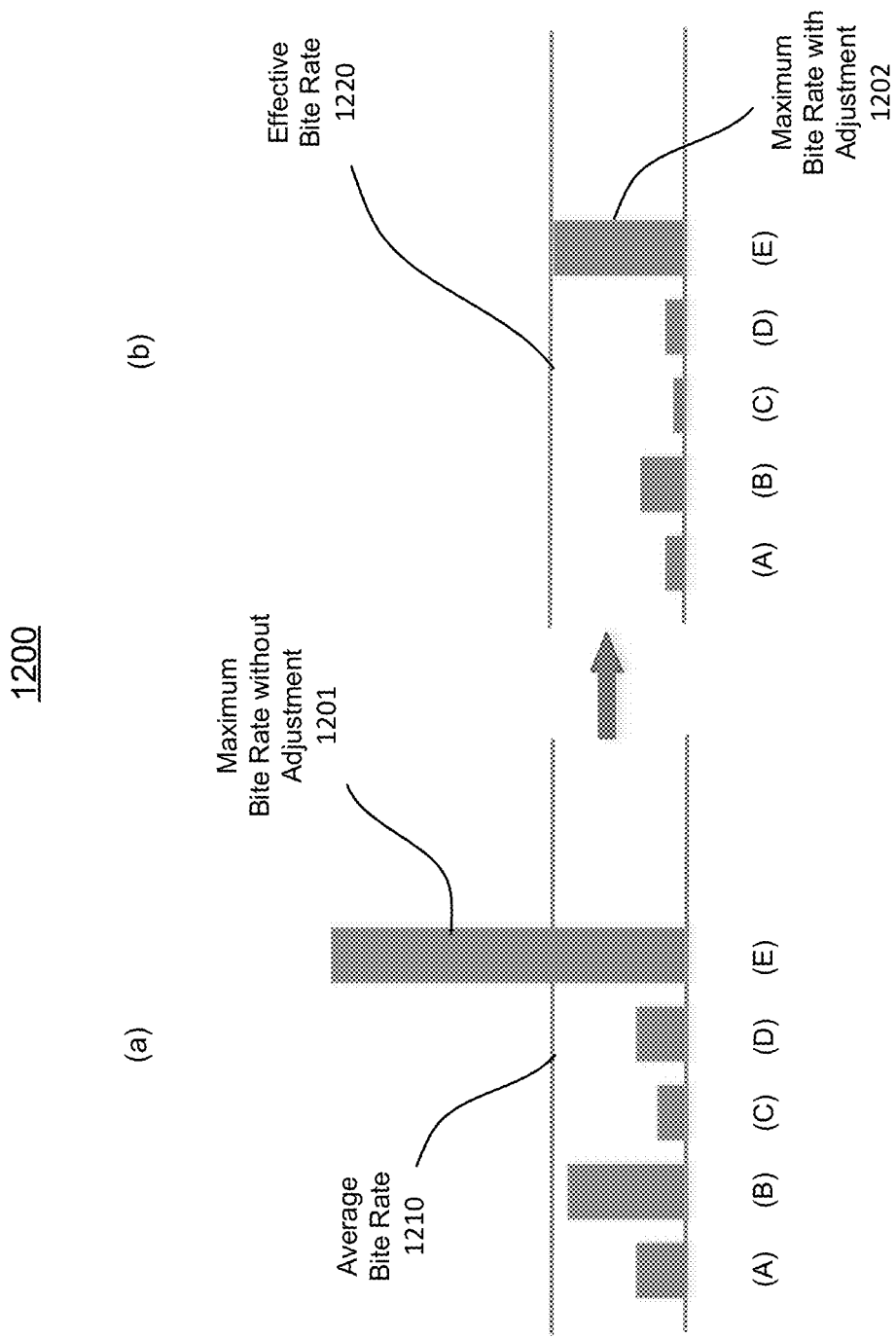
FIG. 12 shows an exemplary illustration of using an effective QP for reducing coding fluctuation, in accordance with various embodiments of the present disclosure.

Then, at the step 807, the encoder can use the effective QP for encoding the image frame. FIG. 12 shows an exemplary illustration of using an effective QP for reducing coding fluctuation, in accordance with various embodiments of the present disclosure. As shown in FIG. 12(*a*), an image frame may comprise several image units, e.g. slices A-E. The content complexity may vary among different image units. For example, the content in the slice E may be substantially more complex than the average level. Thus, using a traditional coding method, the bandwidth (or rate) 1201 required for transmitting the slice E may be substantially higher than the average level 1210. As a result, the user experience may be negatively impacted due to the fluctuation and/or delay in transmission.

In accordance with various embodiments, the encoder can use an effective QP for reducing the coding fluctuation. For example, the encoder may select a QP with the largest value, from the various QPs estimated for the different image units, as the effective QP. As shown in FIG. 12(*b*), using the effective QP to encode all image units in the image frame, all content in the image frame can be transmitted under the effective bit rate 1220, which may be a predetermined bit rate or a desired bit rate (such as an average bit rate). For example, an adjusted rate 1202, which represents the maximum bit rate for transmitting content in the Slice E, is below the effective bit rate 1220.

Furthermore, at step 808, the encoder can determine whether a particular video stream is completed. If not, the system can obtain another image frame in the video stream until the encoder finishes coding the video stream.

In various embodiments, the encoder can update the model parameters for the various rate control models corresponding to each image unit (e.g. coding block group), and repeat the above process. For example, the update to the rate control model can be performed based on the coding information and/or the entropy coding statistics. Referring back to FIG. 7, the encoding of the frame C can be based on the historic coding information 730 collected from the coding of the image frames A and B. For example, in H.264, the encoder can count the number of bits consumed after the coding of each macroblock and can obtain the error statistics after the last macroblock of each row is coded. Thus, the model parameters in the rate control model for coding the macroblock row may be updated based on the QP value used for encoding the macroblock row in the image frame and the error statistics collected from analyzing the outcome of the encoding process. Then, the updated model parameters can be applied to the rate control model for the coding block groups at the same location in the following frames, e.g. participating in the QP prediction process for the next frame.

In accordance with various embodiments of the present disclosure, various techniques can be used for updating the rate control model for each image unit to prevent coding fluctuation, which may occur even when the scene does not change drastically. For example, the encoder can update the rate control model parameters, e.g. $\alpha_j$ and $\beta_j$ for the j-th image unit in an image frame, using the following formulas.

$$\alpha_{new,j} = \alpha_{old,j} + \Delta \alpha_j$$

$$\beta_{new,j} = \beta_{old,j} + \Delta \beta_j$$

In various embodiments, the system can dynamically control the update of the rate control model parameters, $\alpha_j$ and $\beta_j$, by taking advantage of a learning rate, $\mu_j$, for the j-th image unit in an image frame. For example, using the logarithm model, the model parameters, $\alpha_j$ and $\beta_j$, may be updated based on a random gradient decent algorithm using the following formulas, as the coding progresses.

$$\alpha_{new,j} = \alpha_{old,j} + \mu_j \cdot QP_j \cdot (ln(bpp_j) - (\alpha_{old,j} \cdot QP_j + \beta_{old,j}))$$

$$\beta_{new,j} = \beta_{old,j} + \mu_j \cdot (ln(bpp_j) - (\alpha_{old,j} \cdot QP_j + \beta_{old,j}))$$

In various embodiments, the learning rate, $\mu_j$, may be pre-configured or pre-determined. Alternatively, the learning rate may be determined dynamically as the coding progresses. For example the learning rate may be configured or determined as $$\frac{1}{QP^2 + 1},$$

which corresponds to an optimized rate control model. Additionally, the various rate control models associated with the different image units may share the same learning rate, $\mu$.

In various embodiments, one or more sliding windows can be used for preventing coding fluctuation. For example, a sliding window can smooth out the fluctuation in coding/compressing based on the historic coding information.

Figure 9:
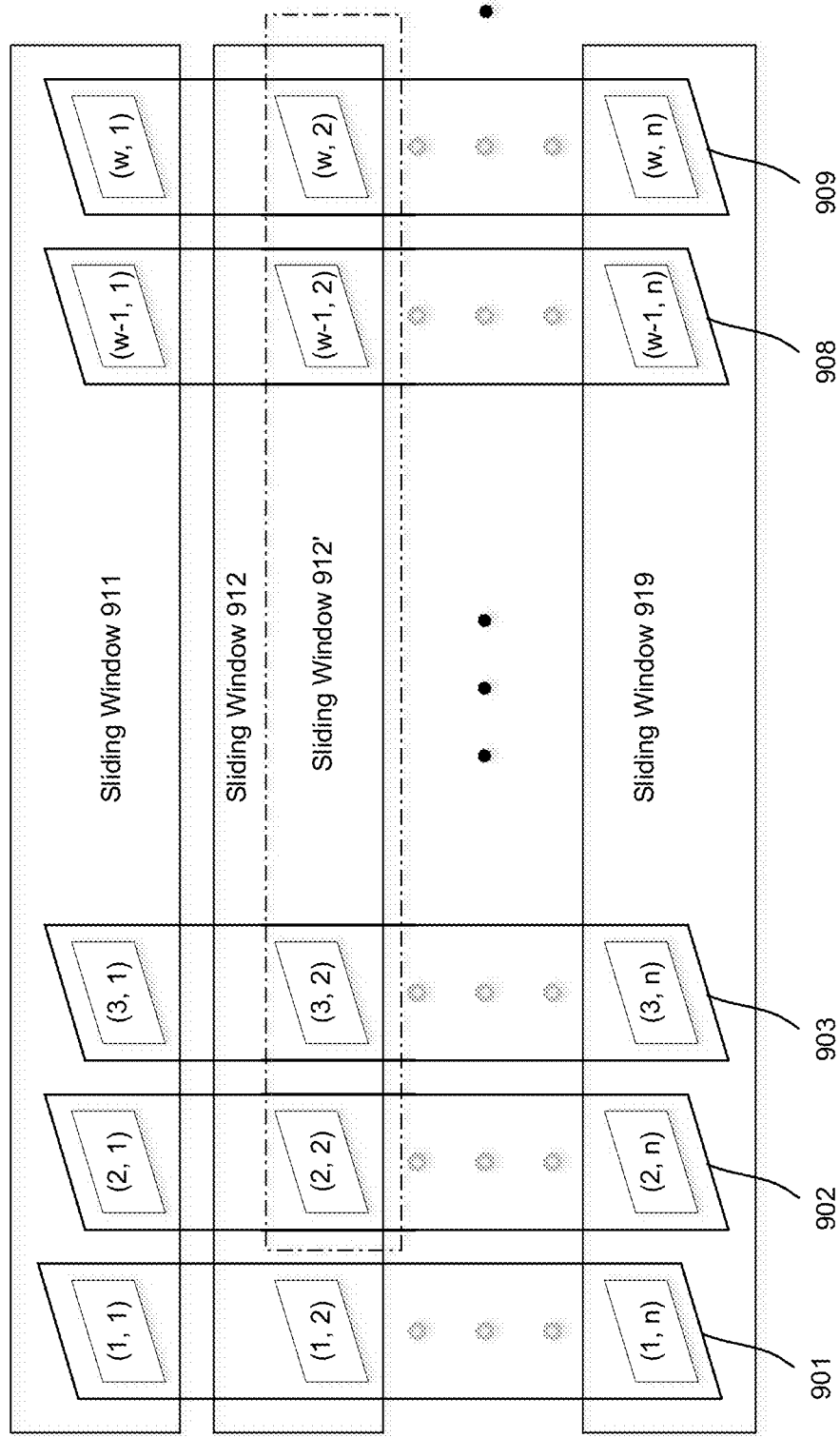
FIG. 9 illustrates using multiple sliding windows for preventing fluctuation in coding an image frame, in accordance with various embodiments of the present disclosure.

FIG. 9 illustrates using multiple sliding windows for preventing fluctuation in coding an image frame, in accordance with various embodiments of the present disclosure. As illustrated, a video stream may comprise one or more image frames 901-909. Each of the image frames 901-909 may include a plurality of image units at various corresponding locations in the image frame. For example, each of the image frames 901-909 may include n slices.

In accordance with various embodiments, the corresponding image units in the various image frames 901-909 may share the same rate control model. The encoder can use a sliding window for determining the optimized model parameters for each group of corresponding image units. As shown in FIG. 9, the encoder can use a sliding window 911 for determining optimized model parameter(s) for the slice 1. The sliding window 911 may comprise the first image units in each image frame, such as the slices (1, 1), (2, 1) . . . and (w, 1). Also, the encoder can use a sliding window 912 for determining the optimized model parameter for the slice 2. The sliding window 911 may comprise the first image units in each image frame, such as the slices (1, 2), (2, 2) . . . and (w,2). In a similar fashion, the encoder can use one or more sliding widows for determining optimized model parameters for the rest of the image units, e.g. using a sliding window 919 for determining the optimized model parameter for the slice n. The sliding window 919 may comprise the last image units in each image frame, such as the slices (1, n), (2, n) . . . and (w, n).

In accordance with various embodiments, the encoder may use sliding windows with different width for different image units. For example, instead of using the sliding window 912, the encoder may use a sliding window 912', which has a shorter width, for determining the model parameter(s) for coding the second image unit in the image frame to be coded (not shown). Additionally, the width of the sliding window 912' may be dynamically determined or configured as the coding progresses.

Figure 10:
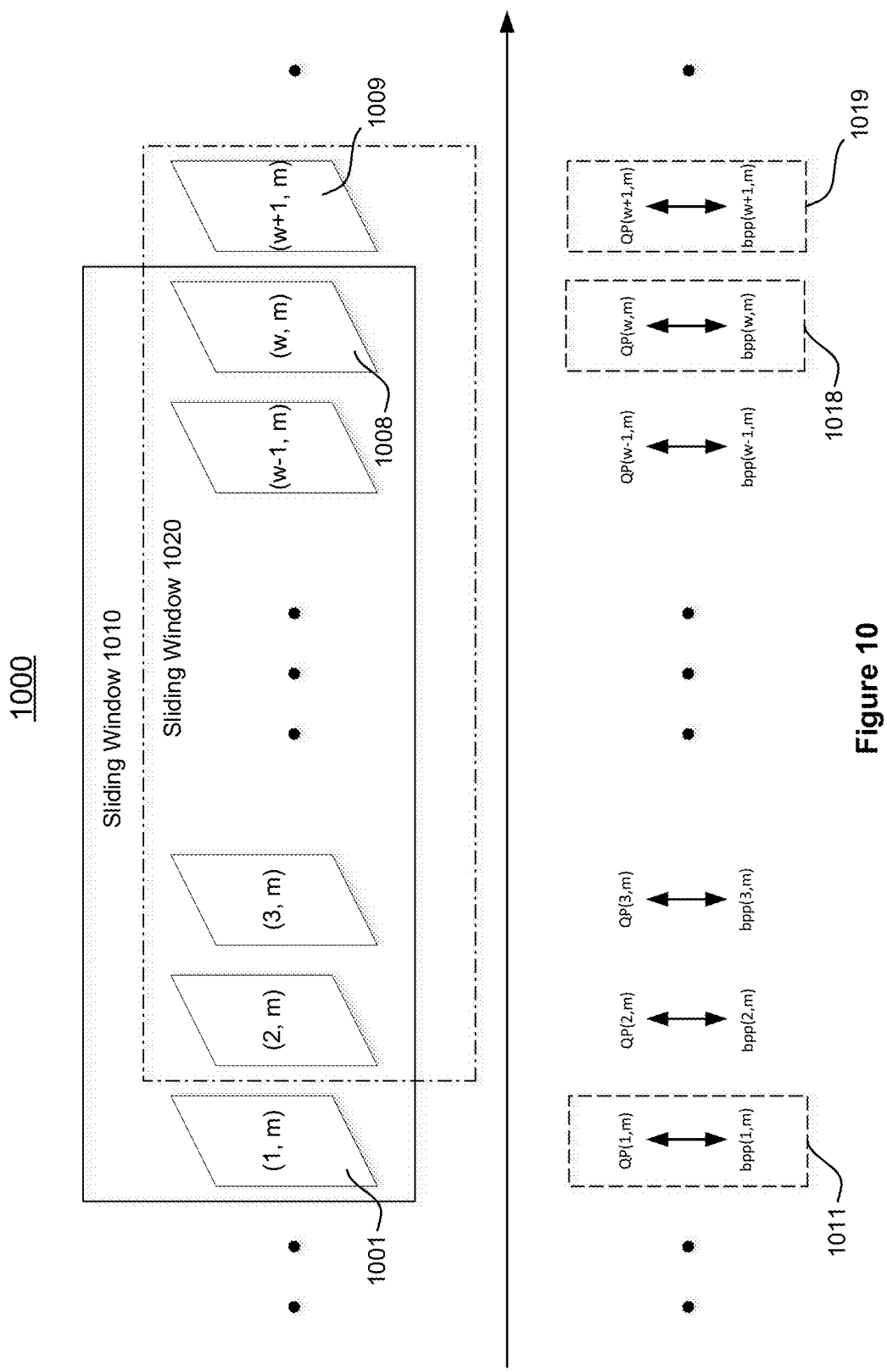
FIG. 10 shows an exemplary illustration of using a sliding window for preventing fluctuation in coding an image unit of an image frame, in accordance with various embodiments of the present disclosure.

FIG. 10 shows an exemplary illustration 1000 of using a sliding window for preventing fluctuation in coding an image unit of an image frame, in accordance with various embodiments of the present disclosure. As illustrated, a sliding window 1010 may be used for determining the optimized model parameters for coding an image unit, m, in an image frame. The sliding window 1010 can include a plurality of image units 1001-1008, each of which locates at a corresponding location (e.g. the same location) in a preceding image frame, and each of the image frame unit in the sliding window 1010 corresponds to a sample point in the plurality of sample points 1011-1018.

As coding progresses, the encoder may use a sliding window 1020, instead of the sliding window 1010, for updating the model parameters. The sliding window 1020 may comprise one or more new image units corresponding to one or more new sample points (e.g. the sample point 1019). In the meantime, one or more old image units, which corresponds to one or more sample points (e.g. the sample point 1011), may be removed from the sliding window 1020.

For example, using the above logarithm R-QP model, each image unit or coding block group (i,j) in the sliding window 1010 may correspond to a sample point (($QP_{i,j}$, ln ($bpp_{i,j}$)), i∈[1,w], j∈[1, n]), assuming that the window size is w and each image frame comprises n image units. As the coding progresses, an updated sliding window 1020 may be used. For example, each image unit or coding block group (i,j) in the sliding window 1020 may correspond to a sample point (($QP_{i,j}$, ln ($bpp_{i,j}$)), i∈[2, w+1], j∈[1, n]).

In various embodiments, the sample points in a sliding window may be pre-processed, so that each sample point in the sliding window can be associated with a distinct QP value. For example, the encoder can calculate an average value for different ln $\overline{(bpp_{k,j})}$ associated with each distinct $QP_{k,j}$. Thus, multiple sample points associated with a same QP value but with different values of ln $\overline{(bpp_{k,j})}$ can be combined into one sample point (i.e., no two sample points having different bits per pixel (bpp) values may be associated with the same QP value).

Assuming that the resultant number of sample points is $N_j$, the system can determine the model parameters, $\alpha_j$ and $\beta_j$, by minimizing the following cost function.

$$J(\alpha_j, \beta_j) = \frac{1}{2} \Sigma_{i=1}^{N_j} (ln(bpp_{i,j}) - (\alpha_j \cdot QP_{i,j} + \beta_j))^2$$

In various embodiments, an optimized solution can be found using different techniques. For example, by letting a $$\frac{\partial J(\alpha, \beta)}{\partial \alpha} = 0 \text{ and } \frac{\partial J(\alpha, \beta)}{\partial \beta} = 0,$$

a least squares solution can be obtained as shown in the following.

$$\begin{bmatrix} \sum_{i=1}^{N_j} QP_{i,j}^2 & \sum_{i=1}^{N_j} QP_{i,j} \\ \sum_{i=1}^{N_j} QP_{i,j} & N_j \end{bmatrix} \begin{bmatrix} \alpha_j \\ \beta_j \end{bmatrix} = \begin{bmatrix} \sum_{i=1}^{N_j} QP_{i,j} \cdot ln(bpp_{i,j}) \\ \sum_{i=1}^{N_j} ln(bpp_{i,j}) \end{bmatrix}$$

When $N_j \cdot \Sigma_{i=1}^{N_j} QP_{i,j}^2 - (\Sigma_{i=1}^{N_j} QP_{i,j})^2 \neq 9$, the model parameters, $\alpha_j$ and $\beta_j$, may be updated using the following formulas as the coding progresses.

$$\alpha_j = \frac{N_j \cdot \sum_{i=1}^{N_j} QP_{i,j} \cdot \ln(bpp_{i,j}) - \sum_{i=1}^{N_j} \ln(bpp_{i,j}) \cdot \sum_{i=1}^{N_j} QP_{i,j}}{N_j \cdot \sum_{i=1}^{N_j} QP_{i,j}^2 - \left(\sum_{i=1}^{N_j} QP_{i,j}\right)^2}$$

$$\beta_j = \frac{\sum_{i=1}^{N_j} \ln(bpp_{i,j}) \cdot \sum_{i=1}^{N_j} QP_{i,j}^2 - \sum_{i=1}^{N_j} QP_{i,j} \cdot \ln(bpp_{i,j}) \cdot \sum_{i=1}^{N_j} QP_{i,j}}{N_j \cdot \sum_{i=1}^{N_j} QP_{i,j}^2 - \left(\sum_{i=1}^{N_j} QP_{i,j}\right)^2}$$

The above condition holds true when there are more than two distinct sample points existing in the sliding window, (i.e. $N_j > 2$). On the other hand, in the cases when there are no more than two distinct sample points existing in the sliding window (i.e. $N_j <= 2$), the model parameters, $\alpha$ and $\beta$, may be updated based on the random gradient decent algorithm as the coding progresses.

In various embodiments, the encoder can use different methods, approaches or configurations for updating the model parameters, $\alpha_j$ and $\beta_j$, for different image units (such as coding block groups) in a image frame. For example, the encoder can use the gradient method for updating the model parameters for image unit(s) with less distinct sample points. On the other hand, the encoder can use the sliding window approach for updating the model parameters for image unit(s) with more distinct sample points. In the same or another example, the encoder can use sliding windows with different width for updating the model parameters for different image units in the image frame. Thus, the encoder can best estimate the coding parameters (such as QP) for encoding the various image units (such as coding block groups) in the image frame.

Figure 11:
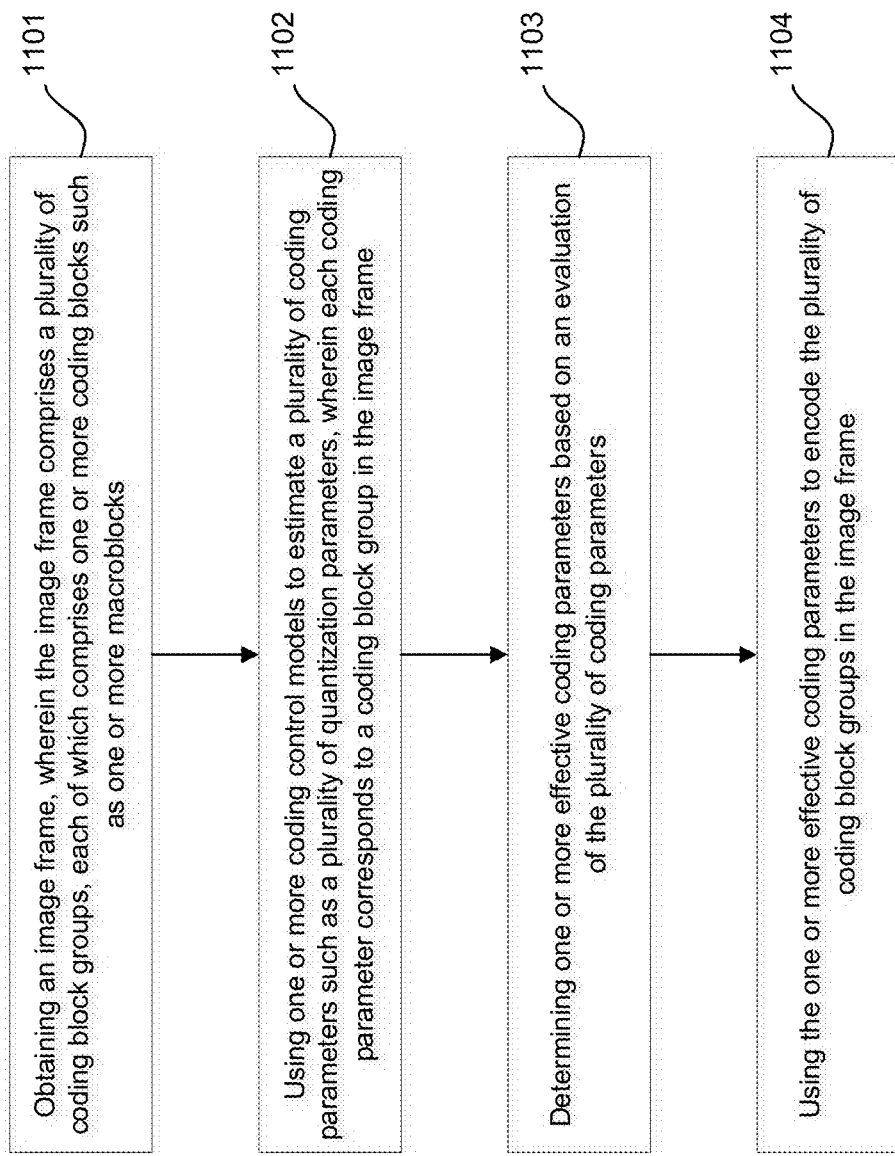
FIG. 11 illustrates a flow chat for supporting video encoding, in accordance with various embodiments of the present disclosure.

FIG. 11 illustrates a flow chat for supporting video encoding, in accordance with various embodiments of the present disclosure. As shown in FIG. 11, at step 1101, a video encoder can obtain an image frame, wherein the image frame comprises a plurality of coding block groups, each of which comprises one or more coding blocks such as one or more macroblocks. At step 1102, the video encoder can use one or more coding control models to estimate a plurality of coding parameters such as a plurality of quantization parameters, wherein each coding parameter corresponds to a coding block group in the image frame. Furthermore, at step 1103, the video encoder can determine one or more effective coding parameters based on an evaluation of the plurality of coding parameters. Then, at step 1104, the video encoder can use the one or more effective coding parameters to encode the plurality of coding block groups in the image frame.

Many features of the present disclosure can be performed in, using, or with the assistance of hardware, software, firmware, or combinations thereof. Consequently, features of the present disclosure may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present disclosure can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Features of the disclosure may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method for supporting video coding, comprising:
obtaining an image frame comprising a plurality of coding block groups, wherein each coding block group comprises one or more coding blocks;
using a first coding control model associated with a first coding block group in the image frame to estimate one or more first coding parameters, the first coding parameters being determined based on a first bit allocation of the first coding block group in the image frame, the first coding control model being associated with a first set of model parameters;
using a second coding control model associated with a second coding block group in the image frame to estimate one or more second coding parameters, the second coding parameters being determined based on a second bit allocation of the second coding block group in the image frame, the second bit allocation being different from the first bit allocation, the second coding control model being associated with a second set of model para s and the second coding control model being different from the first coding control model;
determining one or more effective coding parameters based on an evaluation of the one or more first coding parameters and the one or more second coding parameters;
using the one or more effective coding parameters to encode the plurality of coding block groups in the image frame; and
updating the first set of model parameters of the first coding control model and the second set of model parameters of the second coding control model based on historic coding information including error statistics collected from analyzing an outcome of encoding process.

2. The method of claim 1, further comprising updating at least one of the first set of model parameters or the second set of model parameters using a gradient method, wherein the first set of model parameters are calculated based on a first learning rate, and the second set of model parameters are calculated based on a second learning rate.

3. The method of claim 1, further comprising updating at least one of the first set of model parameters or the second set of model parameters using a sliding window including a sequence of reference image data units, wherein the first set of model parameters are calculated using a first sliding window including a first sequence of reference image data units, and the second set of model parameters are calculated using a second sliding window including a second sequence of reference image data units.

4. The method of claim 1, further comprising:
performing an initial bit allocation for each coding block group in the image frame based on at least one of a target rate for transmitting the image frame or one or more communication constraints; and
adjusting a bit allocation for one or more coding block groups in the image frame based on a complexity of content in the one or more coding block groups.

5. The method of claim 1, wherein each coding block group comprises a group of macroblocks including a slice, a tile, or a row of macroblocks.

6. The method of claim 1, wherein the one or more first coding parameters comprise one or more first quantization parameters to encode the first coding block group, and the one or more second coding parameters comprise one or more second quantization parameters to encode the second coding block group.

7. The method of claim 1, wherein the evaluation comprises obtaining one or more coding parameters with largest values, averaged values, or weighted averaged values.

8. A video encoder, comprising:
a memory that stores one or more computer-executable instructions; and
one or more processors configured to access the memory and execute the one or more computer-executable instructions to:
obtain an image frame comprising a plurality of coding block groups, wherein each coding block group comprises one or more coding blocks;
use a first coding control model, associated with a first coding block group in the image frame to estimate one or more first coding parameters, the first coding parameters being determined based on a first bit allocation of the first coding block group in the image frame, the first coding control model being associated with a first set of model parameters;
use a second coding control model associated with a second coding block group in the image frame to estimate one or more second coding parameters, the second coding parameters being determined based on a second bit allocation of the second coding block group in the image frame, the second bit allocation being different from the first bit allocation, the second coding control model being associated with a second set of model parameters, and the second coding control model being different front the first coding control model;
determine one or more effective coding parameters based on an evaluation of the one or more first coding parameters and the one or more second coding parameters;
use the one or more effective coding parameters to encode the plurality of coding block groups in the image frame; and
update the first set of model parameters of the first coding control model and the second set of model parameters of the second coding control model based on historic coding information including error statistics collected from analyzing an outcome of encoding process.

9. The video encoder of claim 8, wherein the one or more processors are further configured to access the memory and execute the computer-executable instructions to:
update at least one of the first set of model parameters or the second set of model parameters using a gradient method, wherein the first set of model parameters are calculated based on a first learning rate, and the second set of model parameters are calculated based on a second learning rate.

10. The video encoder of claim 8, wherein the one or more processors are further configured to access the memory and execute the computer-executable instructions to:
update at least one of the first set of model parameters or the second set of model parameters using a sliding window including a sequence of reference image data units, wherein the first set of model parameters are calculated using a first sliding window including a first sequence of reference image data units, and the second set of model parameters are calculated using a second sliding window including a second sequence of reference image data units.

11. The video encoder of claim 8,
wherein the one or more first coding parameters comprise one or more first quantization parameters to encode the first coding block group, and the one or more second coding parameters comprise one or more second quantization parameters to encode the second coding block group.

12. The video encoder of claim 11, wherein the one or more processors are further configured to access the memory and execute the computer-executable instructions to:
    perform an initial bit allocation for each coding block group in the image frame based on at least one of a target rate for transmitting the image frame or one or more communication constraints: and
    adjust a bit allocation for one or more coding block groups in the image frame based on a complexity of content in the one or more coding block groups.

13. The video encoder of claim 8, wherein the evaluation comprises obtaining one or more coding parameters with largest values, averaged values, or weighted averaged values.

14. One or more non-transitory computer-readable storage media storing computer-executable instructions that, when executed by a computing system, configure the computing system to perform operations comprising:
    obtaining an image frame comprising a plurality of coding block groups, wherein each coding block group comprises one or more coding blocks;
    using a first coding control model associated with a first coding block group in the image frame to estimate one or more first coding parameters, the first coding parameters being determined based on a first bit allocation of the first coding block group in the image frame, the first coding control model being associated with a first set of model parameters;
    using a second coding control model associated with a second coding block group in the image frame to estimate one or more second coding parameters, the second coding parameters being determined based on a second bit allocation of the second coding block group in the image frame, the second bit allocation being different from the first bit allocation, the second coding control model being associated with a second set of model parameters, and the second coding control model being different from the first coding control model;
    determining one or more effective coding parameters based on an evaluation of the one or more first coding parameters and the one or more second coding parameters;
    using the one or more effective coding parameters to encode the plurality of coding block groups in the image frame; and
    updating the first set of model parameters of the first coding control model and the second set of model parameters of the second coding control model based on historic coding information including error statistics collected from analyzing an outcome of encoding process.

15. A method for supporting video coding, comprising:
    obtaining an image frame comprising a plurality of image units, wherein each image unit comprises one or more macroblocks;
    using a plurality of coding control models associated with a plurality of sets of model parameters to estimate a plurality of quantization parameters, wherein each quantization parameter corresponds to a separate one of the plurality of coding control models associated with an image unit in the image frame and a separate set of the plurality of sets of model parameters, and is determined based on a separate bit allocation of the image unit in the image frame;
    obtaining an effective quantization parameter with a largest value, an averaged value; or a weighted averaged value based on the plurality of quantization parameters;
    using the effective quantization parameter to encode the plurality of image units in the image frame; and
    updating the plurality of sets of model parameters based on historic coding information including error statistics collected from analyzing an outcome of encoding process.

* * * * *